(12) United States Patent
Itoh

(10) Patent No.: US 7,275,214 B2
(45) Date of Patent: Sep. 25, 2007

(54) METHOD OF SETTING DESTINATIONS OF ELECTRONIC MAIL

(75) Inventor: Hiroshi Itoh, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 10/060,782

(22) Filed: Jan. 30, 2002

(65) Prior Publication Data

US 2002/0107930 A1 Aug. 8, 2002

(30) Foreign Application Priority Data

Feb. 6, 2001 (JP) .............................. 2001-029283

(51) Int. Cl.
*G06F 3/00* (2006.01)
(52) U.S. Cl. ...................... 715/752; 715/764; 715/780; 715/739; 715/744
(58) Field of Classification Search ................ 345/752, 345/764, 780, 739, 744; 715/752, 764, 780, 715/739, 744
See application file for complete search history.

(56) References Cited

U.S. PATENT DOCUMENTS 6,226,670 B1 * 5/2001 Ueno et al. .................. 709/207
6,671,718 B1 * 12/2003 Meister et al. .............. 709/206
6,708,205 B2 * 3/2004 Sheldon et al. ............. 709/206

FOREIGN PATENT DOCUMENTS

JP 2797343 5/1990
JP 10257051 A2 9/1998

OTHER PUBLICATIONS

Minich et al. "Searching the Web". http://www.minich.com/interneteducation/searching/search.html, 1999.*
Shigekazu Suzuki; "Using Address Book"; Touch PC, Mainichi Communications; Sep. 24, 2000; 5 pages.
Katsuhito Ida; "Quick Effect, Tips of E-mail"; PC STYLE 21; Jan. 18, 2001; 6 pages.

* cited by examiner

*Primary Examiner*—Tadesse Hailu
*Assistant Examiner*—Michael Roswell
(74) *Attorney, Agent, or Firm*—Schmeiser, Olson & Watts; William H. Steinberg

(57) ABSTRACT

An addition symbol to add two destinations selected from a list of destinations including a group name representing mail addresses of multiple members, and a subtraction symbol to subtract a mail address of an arbitrary member from a group destination are predefined in electronic mail software, so that when an electronic mail message is transmitted to multiple destinations from a communication terminal, the addition symbol or the subtraction symbol is placed between one destination and the other destination in a destination field in a window for composing an electronic mail message to add a destination address to or delete a personal address of a group member from a group name.

12 Claims, 11 Drawing Sheets

METHOD OF SETTING DESTINATIONS OF ELECTRONIC MAIL

FIELD OF THE INVENTION

The present invention relates to a method of specifying destinations of electronic mail transmitted to multiple recipients, and more particularly, to a method of specifying the destinations of electronic mail transmitted to recipients including both a group name having multiple mail addresses and a personal name.

BACKGROUND ART

There has been a known method of communicating characters by electronic mail between information processors such as personal computers having a communication function in a network such as the Internet or an intranet or between communication equipments such as mobile phones connected to a public communication line and connectable to the Internet. In the following description, the apparatus capable of communicating by electronic mail as described above is generally referred to as a "communication terminal."

When an electronic mail message is transmitted from one communication terminal to another communication terminal, a mail address specified for the communication terminal as a destination is specified in an outgoing mail composing window at the one communication terminal, so that the electronic mail message can be transmitted.

A network such as the Internet or an intranet has at least one mail server, and a mail server managing the mail addresses of recipients is provided with mailboxes for the respective mail addresses, and distributes incoming electronic mail messages to mailboxes corresponding to the mail addresses for storing. A mail server passed through during transmission determines the mail address data of a recipient specified in the data of the outgoing mail, and transfers the electronic mail message to the mailbox of the specified mail address.

The communication terminal, which can transmit and receive electronic mail messages in this way, may transmit the same electronic mail message to multiple destinations for the purpose of, for example, distribution of bulletins or notification to general users. Therefore, the electronic mail software is generally provided with a function of simultaneous transmissions to multiple destinations.

In an outgoing mail composing window, for example, if a destination or recipient field or section is filled with multiple destinations separated by commas or semicolons, the communication terminal running the electronic mail software determines that the electronic mail message is to be sent to the multiple destinations, and transmits the electronic mail message with the same contents to the multiple mail addresses corresponding to the names filled in the destination or recipient section.

In recent electronic mail software, multiple destinations can be grouped and registered under a single group name. Therefore, in such software allowing the group registration, a sender may simply specify a group name as a destination in order to transmit an electronic mail message with the same contents to multiple destinations.

The electronic mail software is provided with an address book for recording destination addresses. The sender does not have to type the address of each recipient using the keyboard in composing an outgoing mail message but simply reads out the address book from a storage such as a hard disk drive in the communication terminal to select and specify the mail address of the destination.

Not only personal names but also group names can be registered in the address book. The address book registered with group names has a hierarchical structure, and the sender, for example, double-clicks a group name to display a window showing details of the group and can refer to or edit personal names or mail addresses of all the members registered under the group name.

As described above, with a communication terminal running conventional electronic mail software, multiple mail addresses can be separated by commas or semicolons in order to specify multiple recipients (destinations) and send them an identical electronic mail message at a time. Destinations can be more easily input using the address book. In addition, an electronic mail message with the same contents can be transmitted to multiple destination by simply selecting a group name registered in the address book.

With such a communication terminal running conventional electronic mail software as described above, if a message should not be transmitted to one of the multiple destinations registered under a group name in the address book, for example, the group name could not be used to specify the destinations and individual addresses would have to be specified one by one from the mail addresses in the address book.

In the above case, if the number of personal mail addresses registered under the group name is small, the trouble is of little consequence. However, if the number of mail addresses registered under the single group name is large, selecting all the mail addresses of the group members from the address book should be troublesome and could lower the work efficiency.

Furthermore, in an intranet or the like, a mail server in the network may be provided with an address book in which a group name representing mail addresses of all members of the group including a user concerned is registered, and if the user specifies the group name as a destination, a user's electronic mail message is also transmitted to the user him/herself.

In order to solve the above problems, a technique has been suggested in which registered contents of mail addresses included in a single group name registered in the address book are read out and edited, and the edited contents are registered under a new group name, before specifying the destinations of electronic mail. The new group name can then be specified as a destination, so that only a relatively simple re-registering operation is necessary for transmitting an electronic mail message to multiple correct destinations even if the destinations under the original group name are not entirely in agreement with the destinations of the electronic mail.

However, with the above method of re-registering the addresses under the new group name and specifying the name, the items to be registered under the group name are edited and re-registered before composing an outgoing electronic mail message, which is cumbersome, and still complicated as in the case of inputting all the mail addresses. In addition, if the number of personal mail addresses registered under the group name is small, for example, specifying all the mail addresses from the address book could be quicker. In groupware such as Lotus Notes (TM), only an administrator can change and register the contents of a public address book, and therefore a general user (client) who is not an administrator cannot register a new group name in the public address book. Therefore, a general client user of the Lotus Notes cannot re-register in the public address book and specify a new group name.

In order to solve this problem, a known destination selecting method according to the disclosure of Japanese Laid-Open Patent Application No. 10-257051 provides an option which allows the addresses of all the members registered under a group name to be displayed so that desired addresses can be selected therefrom when the destination is specified by the group name. An electronic mail message is transmitted only to the selected mail addresses under the notation of the group name as a destination. This method could be used by a client user of the groupware in which the original public address book is not changed and the destination can be changed only once in transmitting the electronic mail message.

According to this method, however, the members of the group whose mail addresses have been selected would believe all the members of the group have received the electronic mail message, while any members left out have not received the electronic mail message. Therefore, there arises disparity in acquired information between the members though they are unaware of it.

In addition, according to the above method, if an electronic mail message to group members is to be also transmitted to a mail address other than the group members, the mail address must be separately specified as a destination in addition to the group name. In that case, the recipient of the electronic mail message at the mail address might feel insecure about possible information disparity from the group members because the destination is specified by the mail address.

SUMMARY OF THE INVENTION

The present invention is directed to a solution to the above problems associated with the conventional methods, and it is an object of the present invention to provide a method of setting destinations of electronic mail according to which operation symbols used to increase and reduce mail addresses of destinations registered as a group are predefined to increase or reduce the destinations as desired while the group name is used as a destination, and the destination items displayed on the recipient side can be selected between the group name only and the group name together with mail addresses, so that the user can select whether to let the recipients be aware or unaware of the addition to or deletion from the full members of the group.

It is another object to provide a method of setting destinations of electronic mail according to which, regardless of the number of items registered under a group name in an address book, some destinations having mail addresses not included in those under the registered group name can readily be specified at the time of selecting destinations in an outgoing mail composing window.

It is yet another object to provide a method of setting destinations of electronic mail according to which when a user transmits an electronic mail message under a group name, and the mail address of the user is registered under the group name in an address book, the destination can readily be changed so that the electronic mail message is not transmitted to the user or sender.

In order to achieve the above-described objects, a method of setting destinations of electronic mail transmitted using electronic mail software from a communication terminal to multiple destinations according to the present invention comprises the steps of predefining in the electronic mail software an addition symbol to add two destinations selected from a list of destinations including a group name representing mail addresses of multiple members, and placing the addition symbol between one and the other destinations in a destination section on a screen for composing an outgoing mail to thereby set destinations including the mail addresses of the one and the other destinations.

The addition symbol used in the present invention denotes to the user that the mail addresses of the destinations located on both sides of the addition symbol are to be added.

A method of setting destinations of electronic mail transmitted to multiple destinations from a communication terminal using electronic mail software and using a group name representing mail addresses of multiple members registered in a list of destinations according to the present invention comprises the steps of predefining in the electronic mail software a subtraction symbol to subtract from one destination indicated by a group name the other destination, and placing the subtraction symbol between the one destination and the other destination in a destination section on a screen for composing an electronic mail message to be transmitted to thereby set destinations in which the mail address of the other destination is deleted from the mail addresses of the members of the group of the one destination.

The subtraction symbol used in the present invention may readily suggest to the user that the mail address of the destination on the right side of the subtraction symbol is to be subtracted from the mail address of the destination on the left side.

A method of setting destinations of electronic mail transmitted to multiple destinations from a communication terminal using electronic mail software according to the present invention comprises the steps of predefining in the electronic mail software an addition symbol to add two destinations selected from a list of destinations including a group name representing mail addresses of multiple members, and a subtraction symbol to subtract from one destination indicated by the group name the other destination, and placing the addition symbol or the subtraction symbol between the multiple destinations in a destination section on a screen for composing an electronic mail message to be transmitted to thereby set destinations in which addition or subtraction is performed on the mail addresses of the destinations.

In the present invention, if the number of the multiple destinations is at least three, the addition symbol and the subtraction symbol may be placed in the destination section, so that the mail addresses of the destinations can be subjected to addition and subtraction to set the destinations.

In the present invention, when the addition symbol and the subtraction symbol are used to set the destinations, order specifying operation symbols may be predefined, which are placed to contain the addition symbol or the subtraction symbol together with destinations therebetween so that the order of priorities in operation between destination setting by the addition symbol and destination setting by the subtraction symbol can be specified, and in the destination section on the screen for composing an electronic mail message to be transmitted, using the order specifying operation symbols, at least one set of destinations may be set from destinations to be added with the addition symbol or subtracted with the subtraction symbol, and the specified operation may be performed with priority for setting the destinations.

The order specifying operation symbols used in the present invention may readily suggest to an electronic mail user that the operation of the mail addresses of the destinations between the order specifying symbols has priority.

The addition symbol can be used to add a personal name or a second group name to a first group name to be a destination, the personal name being other than the members of the first group, if, at the time of transmitting electronic mail using the electronic mail software, the destinations of the electronic mail are produced by adding the personal name other than the members of the first group name or the second group name to all the members of the first group name, the first group name and the personal name or the second group name may be selected in the destination section on a screen for selecting recipients by the electronic mail software, while the addition symbol is entered adjacent to the personal name or the second group name, and if the addition symbol is in the destination section, the electronic mail software sets the mail address of the personal name or mail addresses of all the members of the second group name adjacent to the addition symbol in addition to the mail addresses of all the members of the first group as the destinations of the electronic mail.

The subtraction symbol can be used to delete from a first group name to be a destination an arbitrary personal name of the members of the first group name or a second group name, and if, at the time of transmitting electronic mail using the electronic mail software, the destinations of the electronic mail are produced by deleting an arbitrary personal name in the members of the first group name or the second group name from all the members of the first group name, the first group name and the personal name or the second group name may be selected in the destination section on a screen for selecting recipients by the electronic mail software, while the subtraction symbol is entered adjacent to the personal name or the second group name, and if the subtraction symbol is entered in the destination section, by the electronic mail software, the mail address of the personal name or the mail addresses of all the members of the second group may be deleted from the mail addresses of all the members of the first group name for setting the destinations of the electronic mail.

In the present invention, if the destinations of the electronic mail are set by adding the mail address of a personal name or the mail addresses of all the members of the second group name to the mail addresses of all the members of the first group name as one of the multiple destinations, the addition symbol may be selected and placed adjacent to the personal name or the second group name in said destination section, and if the destinations of the electronic mail are set by subtracting the mail address of the personal name or the mail addresses of all the members of the second group name from the mail addresses of all the members of the first group name, the subtraction symbol may be selected and placed adjacent to the personal name or the second group name, whereby the personal name or the second group name can arbitrarily be added to or subtracted from the mail addresses of all the members of the first group.

In the electronic mail software according to the present invention, in addition to the first group name, and the personal name or the second group name, a second personal name or a third group name different from both the names may be used as one of the at least three, multiple destinations, and if the destinations of the electronic mail are set by using one of the addition symbol and the subtraction symbol between the first group name and the personal name or the second group name, and the other of the addition symbol and the subtraction symbol between the personal name or the second group name and the second personal name or the third group name, the electronic mail software may perform operation for mail addresses with the one of the addition symbol and the subtraction symbol, and operation for mail addresses with the other of the addition symbol and the subtraction symbol to set the destinations of the electronic mail.

If the order specifying operation symbols are used in the destination section in addition to the addition symbol and the subtraction symbol, the operation given priority by the order specifying operation symbols may be performed and then operation by the remaining operation symbol may be performed sequentially from the left to set mail addresses.

In the present invention, if the destinations of the electronic mail include a group name and a personal name set using at least one of the operation symbols, the electronic mail software deletes the personal name and the operation symbols from the destination name data in the data to be transmitted before the transmission of the electronic mail so that only the group name is displayed in the destination section on a screen displayed at each destination.

The electronic mail software according to the present invention may produce a selection screen for inputting the addition symbol, the subtraction symbol and the order specifying operation symbols in the destination section on the screen for selecting recipients in order to specify the destinations of the electronic mail.

In the electronic mail software according to the present invention, if the destinations of the electronic mail include a group name and a personal name set using at least one of the operation symbols, the electronic mail software may transmit items in the destination section of an outgoing mail composing screen as the destinations of the electronic mail for the destination data in the data to be transmitted so that each of the operation symbols is displayed in addition to the group name and the personal name displayed in the destination section of the screen displayed at each destination.

In the electronic mail software according to the present invention, a new group name may be assigned to destinations for registration in a destination list, the destinations being set using at least one of an addition symbol to add two destinations selected from the destination list including a group name, and a subtraction symbol to subtract from one destination indicated by a group name the other destination, and multiple group names or personal names selected from the destination list. Alternatively, a new group name may be registered in a destination list, the new group name being given to the destinations set by using the addition symbol, the subtraction symbol, order specifying operation symbols for specifying the order of priorities in operation between destination setting with the addition symbol and destination setting with the subtraction symbol, and multiple group names or personal names selected from the destination list.

In the electronic mail software according to the present invention, the new group name may be subjected to operation with another personal name or group name using at least one of the addition symbol and the subtraction symbol to set the destinations. Alternatively, the new group name may be subjected to operation with another personal name or group name using the addition symbol, the subtraction symbol and the order specifying operation symbols to set the destinations.

In the electronic mail software according to the present invention, the personal name and the operation symbols may be deleted from the recipient data in the data to be transmitted before the transmission of the electronic mail so that only the new group name is displayed in the destination section on a displayed screen at the destination.

PREFERRED EMBODIMENTS OF THE INVENTION

The present invention will be now described with reference to the embodiments shown in the accompanying drawings.

Figure 1:
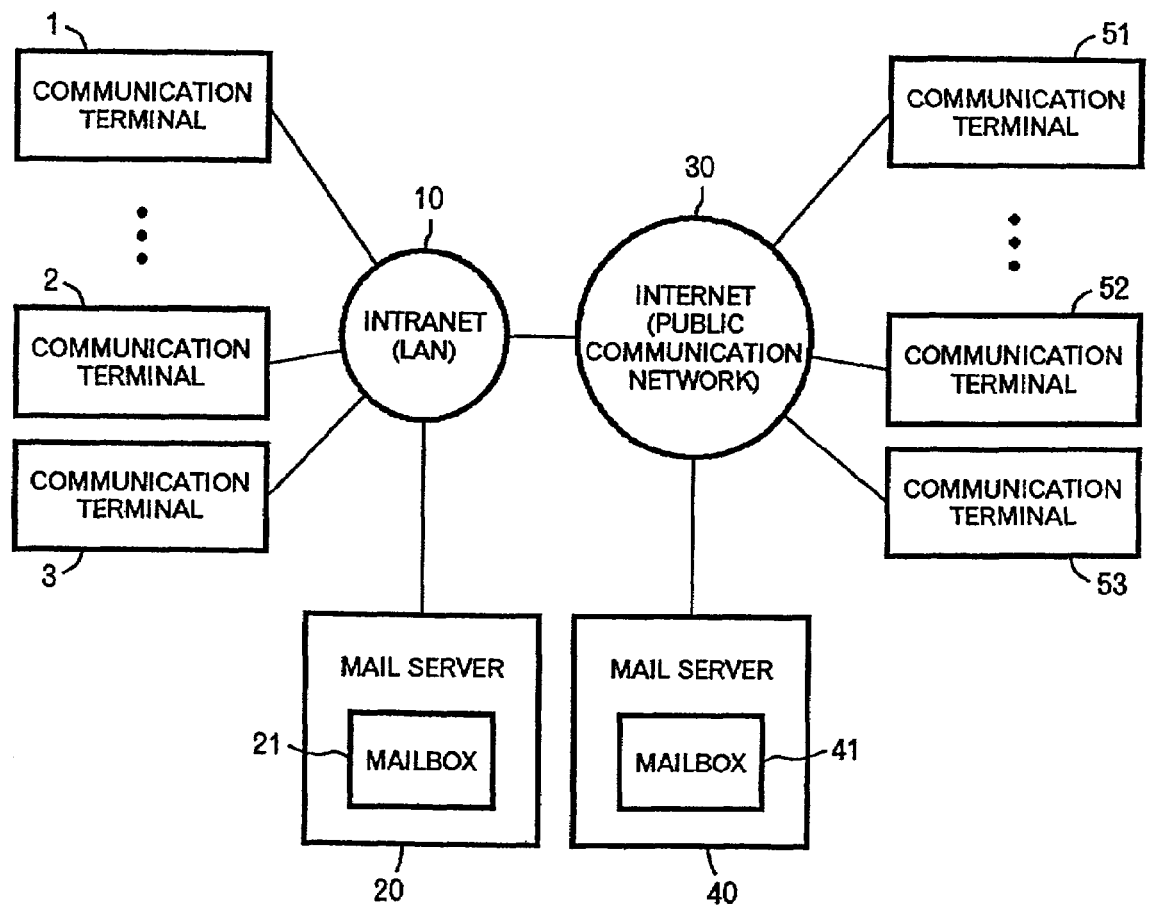
FIG. 1 is a block diagram of a communication environment for performing a method of setting destinations of electronic mail according to one embodiment of the invention.

FIG. 1 is a block diagram of a communication environment for performing a method of setting destinations of electronic mail according to one embodiment of the invention.

Communication terminals 1 to 3 and 51 to 53 in FIG. 1 are, for example, information processors such as personal computers capable of communicating through an intranet 10 or the Internet 30, or communication terminals such as mobile phones having an Internet connection function such as i mode. The intranet 10 is a communication network such as a LAN (Local Area Network) in a limited area in a corporation, for example, and can be accessed only by a limited number of people. The Internet 30 is a communication network available to an unspecified, large number of people through a public communication line. The communication terminals 1 to 3 are connected to the intranet 10, and the communication terminals 51 to 53 are connected to the Internet 30.

The intranet 10 is, for example, provided with a mail server 20 such as Domino (TM) of Lotus Development Corporation, and a mailbox 21 storing incoming electronic mail messages (incoming mail messages) is provided in the mail server 20. Similarly, the Internet 30 includes a mail server 40 of, for example, a private provider, and a mailbox 41 storing incoming mail messages is provided in the mail server 40. The transmission and reception of electronic mail in the intranet 10 are managed by the mail server 20, and a public address book is also provided in the mail server 20. On the other hand, the transmission and reception of electronic mail through the Internet 30 are managed by the mail server 40, and each address book is limited to a private address book provided in the communication terminal on the sender side.

Figure 2:
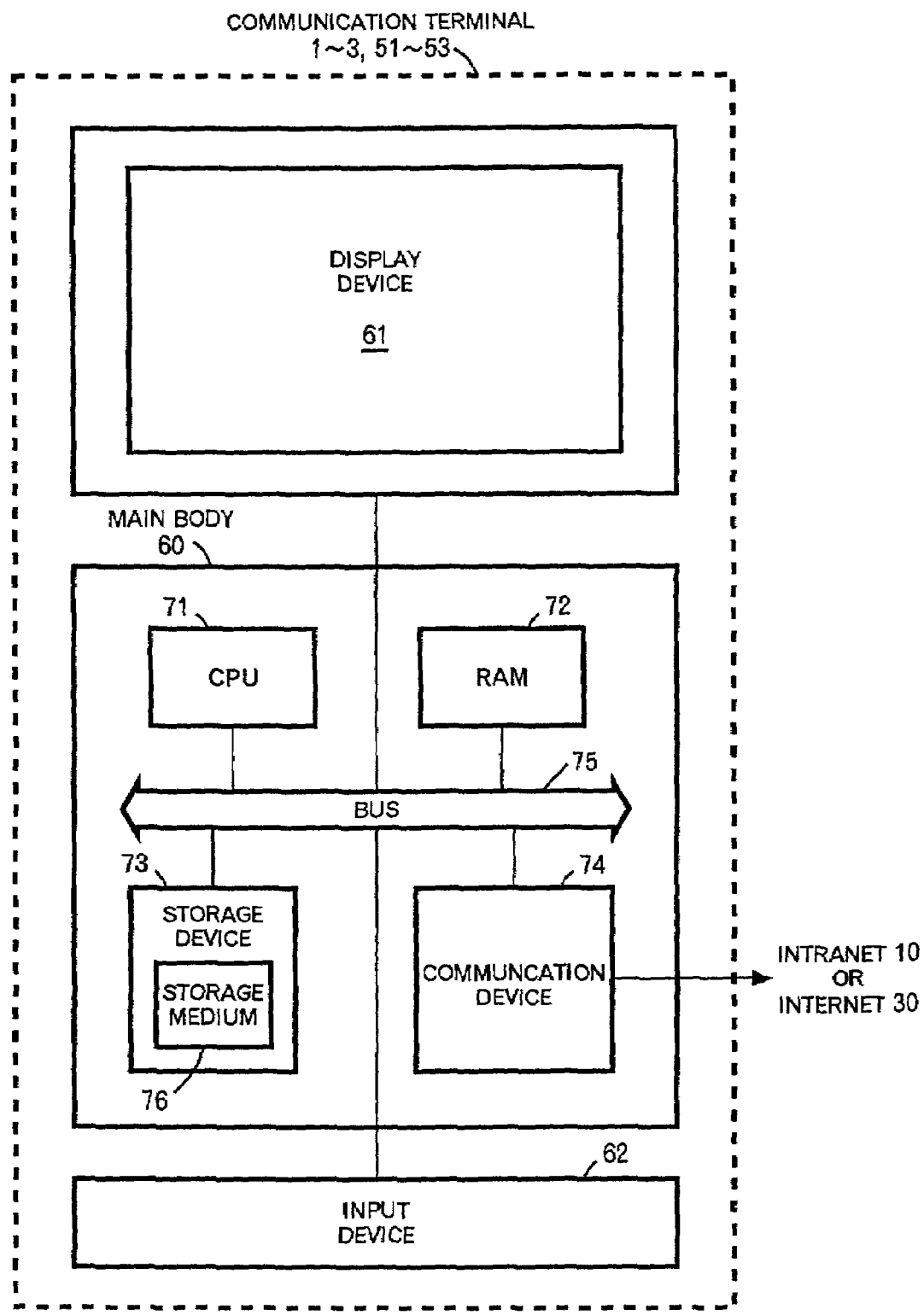
FIG. 2 is a block diagram illustrating an example of the internal configuration of the communication terminals in FIG. 1.

FIG. 2 is a block diagram of an example of the internal configuration of the communication terminals 1 to 3 and 51 to 53 in FIG. 1.

Each of the communication terminals 1 to 3 and 51 to 53 includes a main body 60 which is an information processor for digitizing and modulating transmission signals of outgoing electronic mail messages, and for decoding and demodulating received signals of incoming electronic mail messages, a display device 61 for displaying character information such as an electronic mail message and image information such as a photograph or an illustration, and an input device 62 such as a keyboard used to input directions to the main body 60.

The main body 60 includes a microprocessor (CPU) 71 as a processor for decision processing and control of various portions, a RAM (Random Access Memory) 72 storing dynamically used software such as an operating system and mailing software, a storage device 73 storing received electronic mail messages and data, a communication device 74 for communication with the intranet 10 or the Internet 30, and a bus 75 connecting the devices with one another so that data can be transferred between the devices. The storage device 73 includes a storage medium 76 on which data are actually written.

Figure 3:
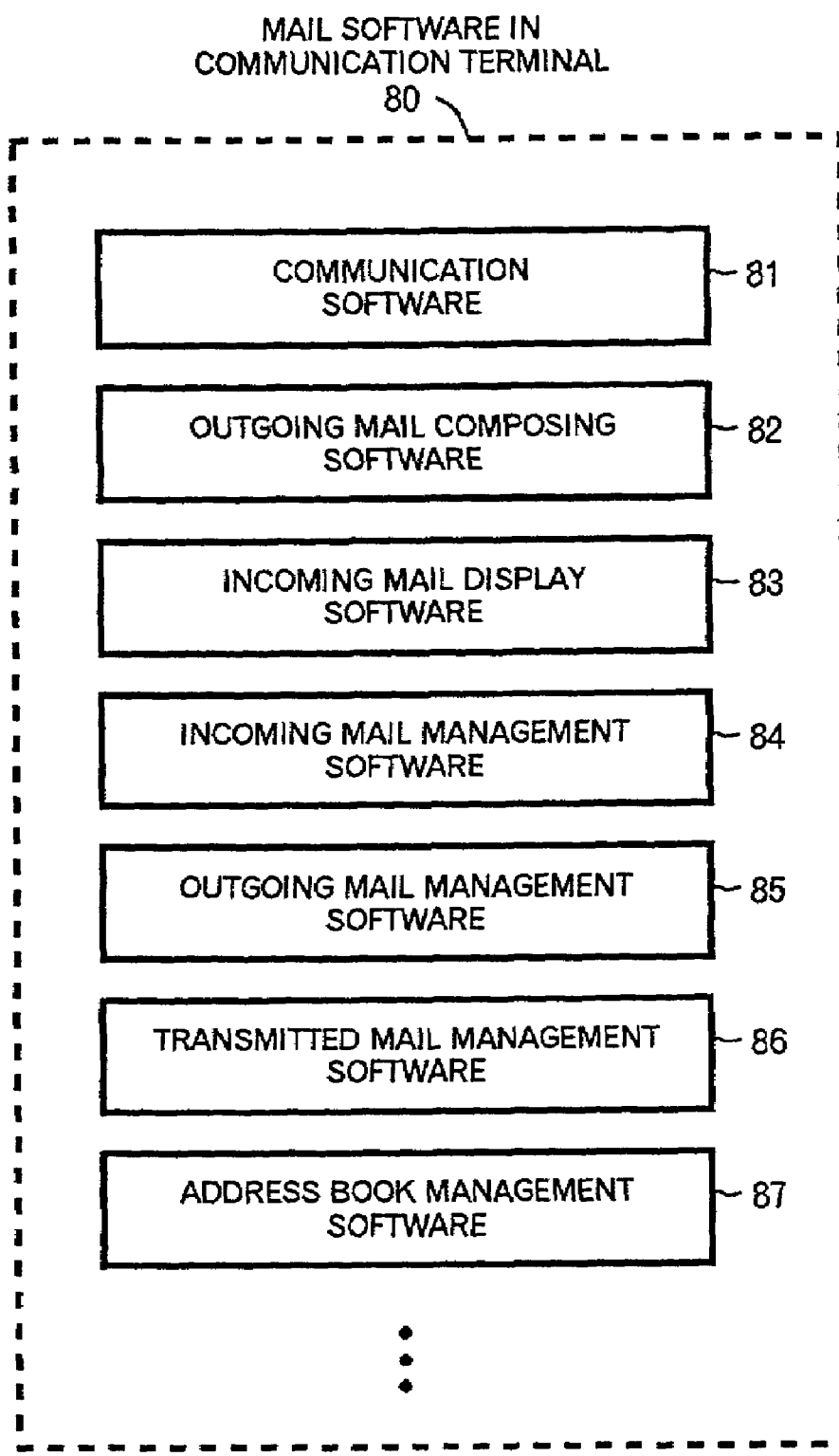
FIG. 3 is a block diagram illustrating an example of electronic mail software stored in the communication terminals in FIG. 1.

FIG. 3 is a block diagram of an example of electronic mail software stored in the storage device 73 or the RAM 72 in the communication terminals 1 to 3 and 51 to 53.

The electronic mail software 80 includes communication software 81 for communication with the intranet 10 or the Internet 30, outgoing mail composing software 82 for composing an outgoing electronic mail message, incoming mail display software 83 used to display a received electronic mail message at the display device 61 shown in FIG. 2, incoming mail management software 84 for storing incoming electronic mail messages at, for example, an inbox address or a cabinet address in the storage device 73, outgoing mail management software 85 for storing an outgoing electronic mail message at, for example, an outbox address or a cabinet address in the storage device 73, transmitted mail management software 86 for storing transmitted electronic mail messages at, for example, a transmitted file address or a cabinet address, and address book management software 87 for managing registration in, change to, and deletion from a personal address book.

Figure 4:
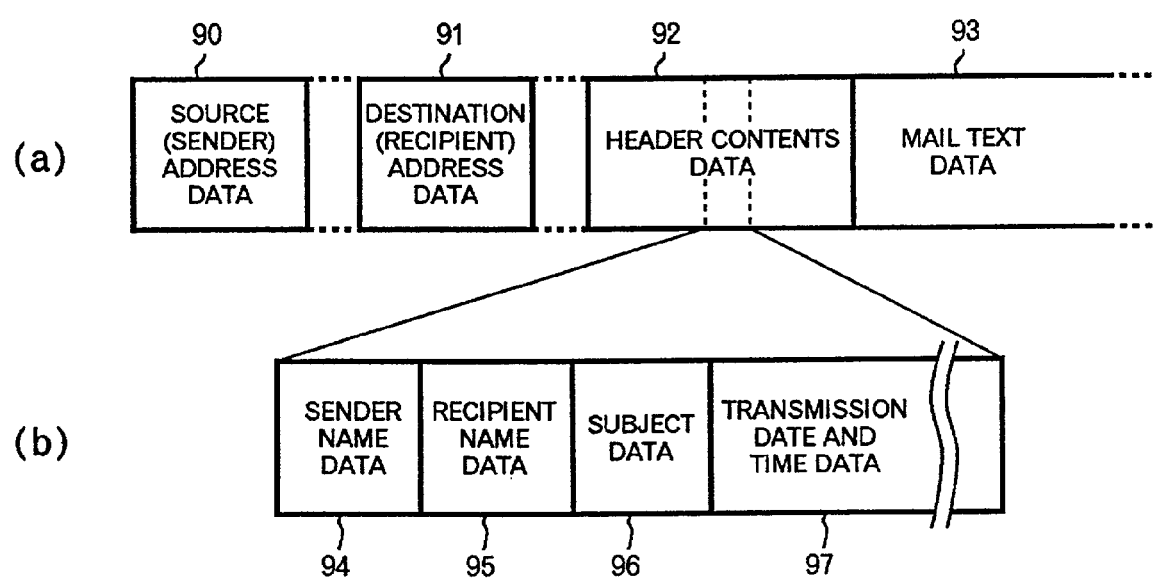
FIG. 4(a) is a schematic diagram of the data structure of electronic mail transmitted from a communication terminal.
FIG. 4(b) shows a part of FIG. 4(a) in detail.

FIG. 4(a) is a diagram showing an example of the general data structure of an electronic mail message to be transmitted from a communication terminal, while FIG. 4(b) is a diagram showing in detail a part of the structure shown in FIG. 4(a).

The source address data of a sender which may be used for reply mail is stored at 90 in FIG. 4(a). The destination address data of a recipient referred to by the mail servers 20 and 40 in determining where to forward the electronic mail message is stored at 91. Header data of the outgoing electronic mail message are stored at 92, and text data of the outgoing electronic mail message are stored at 93. The header section 92 contains data indicated at the header of the electronic mail message.

Data related to the sender is stored at 94 in FIG. 4(b), while data related to the recipient is stored at 95. Data related to the title or subject of the electronic mail message is stored at 96, and data related to the date and time of transmission is stored at 97. While other header data of an electronic mail message such as data in a CC (Carbon Copy) section or recipient data in a BCC (Blind Carbon Copy) section may be included, processing of such data is similar to that of the recipient name data 95 and, therefore, is not described.

For example, if the destination of an outgoing electronic mail message is a group name, and the electronic mail message is transmitted to all the members of the group, the group name is stored as the recipient name data 95, and individual address data selected from all the group members is sequentially stored as the destination (recipient) address data 91 for each transmission and, thus, the electronic mail message is transmitted to all the members.

The mail server 20 or 40 determines the forwarding address of an electronic mail message based on the destination (recipient) address data 91 and, therefore, can forward the transmitted electronic mail message to the mailbox at the mail address of each group member even if the group name is stored as the recipient name data 95. The group name of the recipient name data 95 is indicated only at the header on a display screen for the incoming electronic mail message, and is not used by the mail server 20 or 40.

Figure 5:
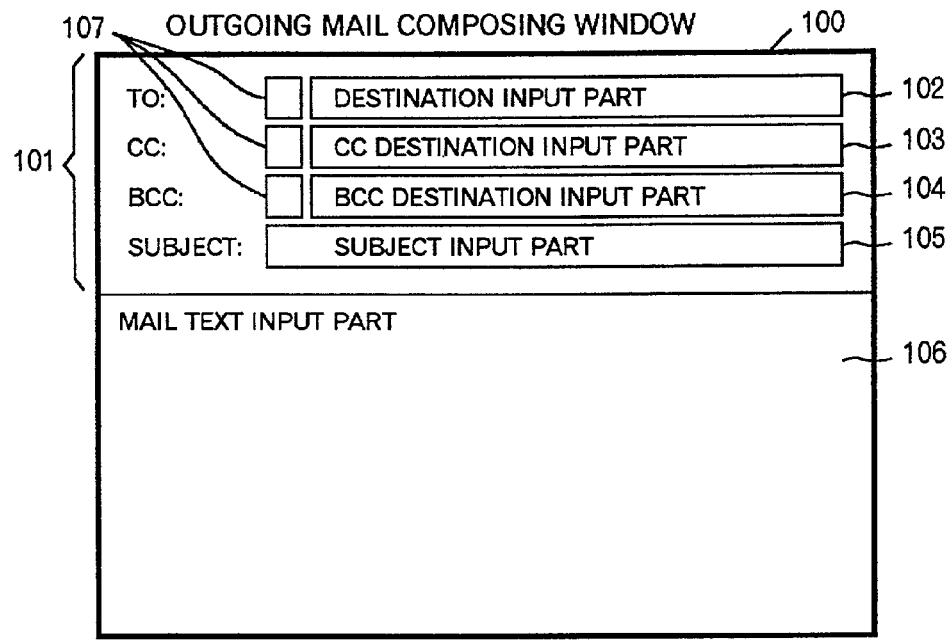
FIG. 5 is a view illustrating an example of a window for composing an outgoing electronic mail message.

FIG. 5 illustrates an example of a screen or window for composing an outgoing electronic mail message.

An outgoing mail composing window 100 includes a header field or part 101 in which information necessary for transmission and reception of an electronic mail message is input, and a mail text input part 106 in which a text of the electronic mail message is input. The header part 101 includes a destination input part 102 in which a personal name of a recipient or a group name is input, a CC destination input part 103 in which a name of a person or a group to receive a copy of the message is input, a BCC destination input part 104 in which a name of a person or a group to receive a copy without being known to other recipients, a subject input part 105 in which a title or subject of the electronic mail message is input, and address book reference buttons 107 for calling an address book allowing destinations (recipients) to be input in the destination input part 102, the CC destination input part 103, and the BCC destination input part 104, respectively, by simple selection processing.

Figure 6:
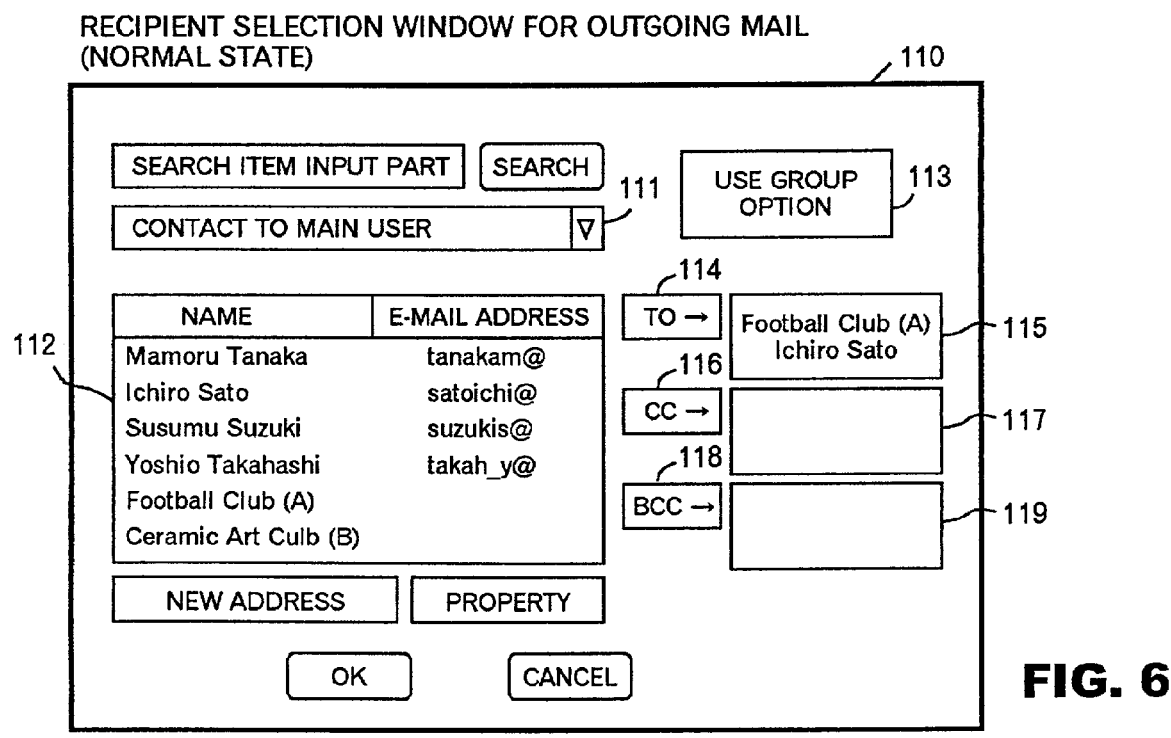
FIG. 6 is a view illustrating an example of a window for selecting a recipient input to a destination input part.

FIG. 6 is an example of a screen or window used to select a recipient to be input to the destination input part 102.

The address book is called by the address book reference button 107 and displayed at an address list section 112 included in the recipient selection window 110 in FIG. 6, and a name selected from the address book is transcribed to a destination section 115 by clicking a destination (To) button 114. Similarly, a selected name is transcribed to a CC destination section 117 by clicking a CC destination button 116, while a selected name is transcribed to a BCC destination section 119 by clicking a BCC destination button 118. The address book can be selected using, for example, a selection button 111. A use group option button 113 is provided in the recipient selection window 110 to enable a group option so that an arbitrary mail address can be deleted from or added to registered items (mail addresses) in a registered group name.

Figure 7:
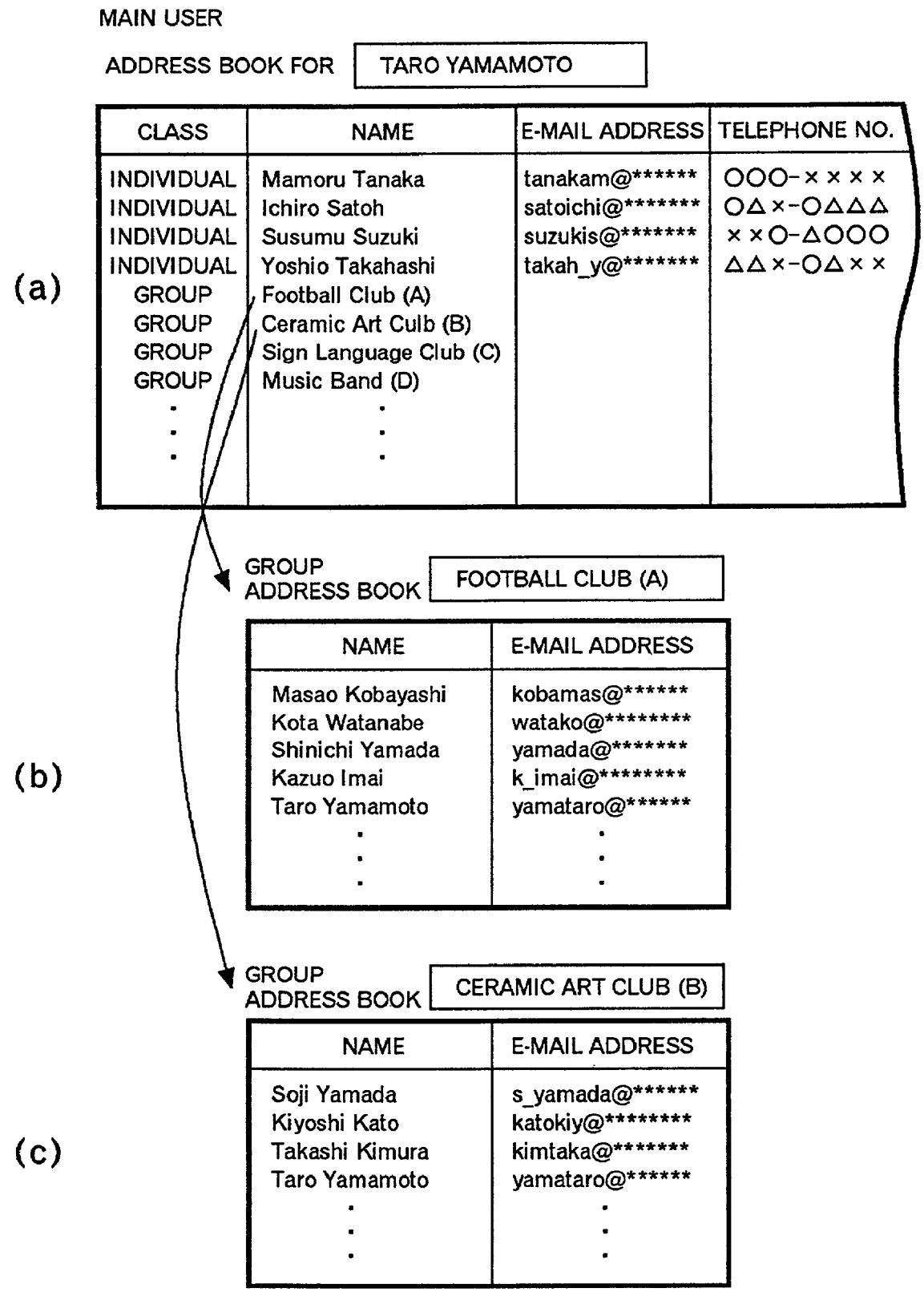
FIGS. 7(a) to 7(c) show examples of registered items in an address book which allows group registration.

FIG. 7 illustrates examples of registered items in an address book which allows group registration.

FIG. 7(a) shows registered items in a typical address book including both individual or personal names (displayed together with electronic mail or e-mail addresses) and group names. FIG. 7(b) shows registered personal names (together with electronic mail addresses) of members of a football club (group name) which are displayed when the football club is selected in FIG. 7(a). FIG. 7(c) shows registered personal names (together with electronic mail addresses) of members of a ceramic art club (group name) which are displayed when the ceramic art club is selected in FIG. 7(a). More specifically, the displayed items of a normal address book and the displayed items for the personal names of members in a selected group are registered in a hierarchical structure.

Figure 8:
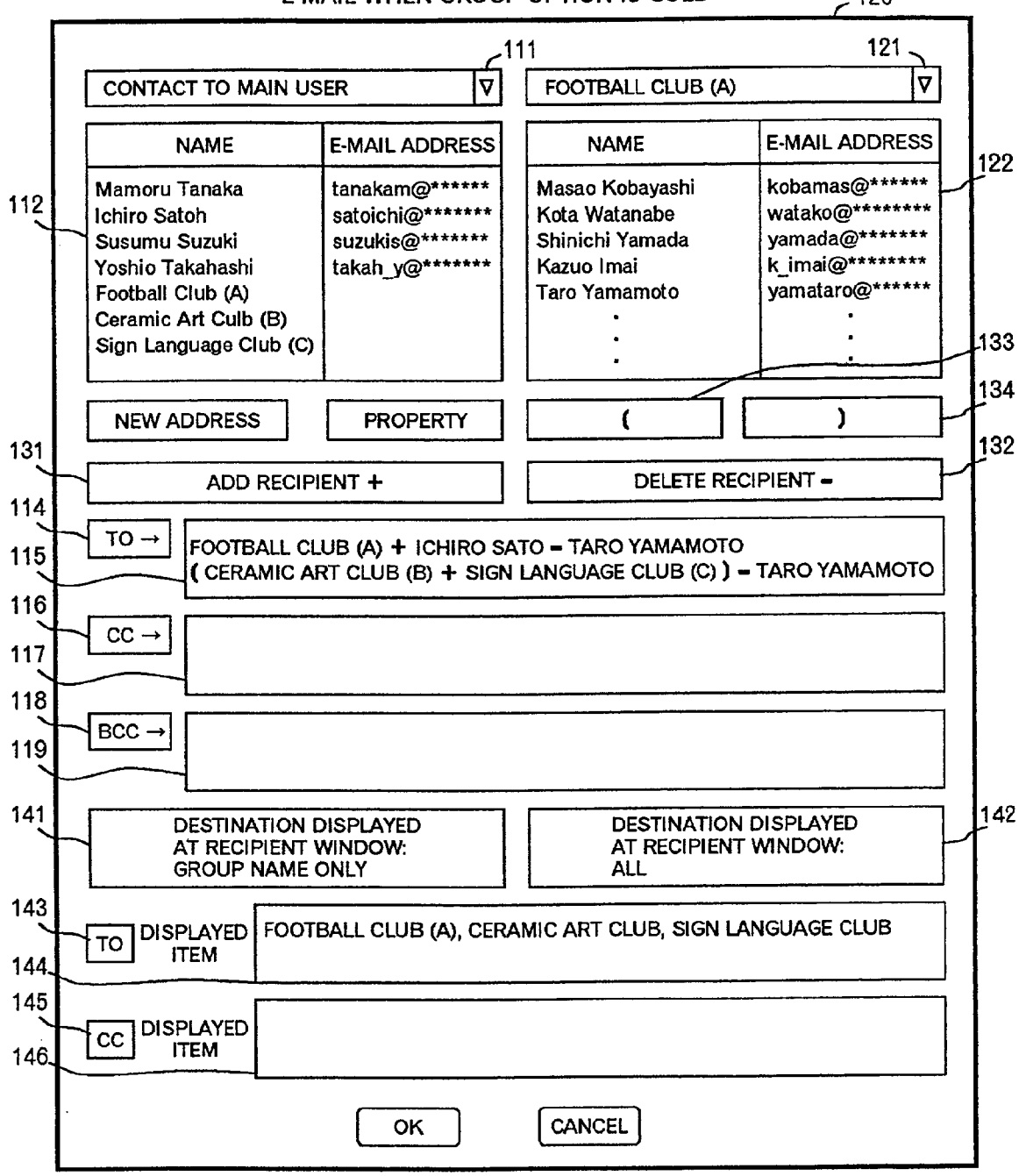
FIG. 8 is a view illustrating an example of a recipient selection window when a group option is used.

FIG. 8 illustrates an example of a recipient selection window when the group option is used.

The recipient selection window in FIG. 8 is different from the recipient selection window in the normal state in FIG. 6 in the following additional features.

(1) An address list section 122 for indicating the personal names of the members of a group as shown in FIG. 7(b) or 7(c) in addition to the normal address book shown in FIG. 7(a).

(2) A selection button 121 for selecting the address list 122.

(3) A recipient addition button 131 for inputting an operation symbol "+" to add one destination to another destination to set the destinations. Note that the destination to be added may be not only a personal name (personal address) but also a group name.

(4) A recipient deletion button 132 for inputting an operation symbol "−" to subtract or remove one destination from another destination which is a group name.

(5) A specifying start button 133 and a specifying end button 134 used to input an operation symbol "("representing the start of operation with priority and an operation symbol ")" representing the end of the operation with priority, respectively, in order to specify the order of priorities for the operations when the destinations are set by combining the addition symbol "+" and the subtraction symbol "−".

(6) A personal display deletion button 141 provided to limit the destination items to be displayed at the communication terminal of a recipient of an electronic mail message only to group names.

(7) An all display button 142 provided to allow all the group names and all the personal names to be displayed at the communication terminal of a recipient of an electronic mail message.

(8) A destination (To) button 143 provided to apply a selection result by the personal display deletion button 141 or the all display button 142 to the destination section in the communication terminal of a recipient of an electronic mail message.

(9) A destination section 144 provided to confirm the items to be displayed in the destination section of the communication terminal of a recipient before transmission. FIG. 8 shows items to be displayed in the destination section of a recipient when the personal display deletion button 141 is selected.

(10) A CC destination button 145 provided to apply a selection result by the personal display deletion button 141 or the all display button 142 to the CC destination section to be displayed in the communication terminal of a recipient of an electronic mail message.

(11) A CC display section 146 provided to confirm items to be displayed in the CC destination section of the communication terminal of a recipient before transmission.

The addition symbol "+" is a symbol used in an addition expression in general mathematics, and therefore a sender and a recipient who are electronic mail users can easily imagine that the mail addresses of the destinations provided on both sides of the "+" symbol are to be added. Also, the subtraction symbol "−" is a symbol used in a subtraction expression in general mathematics, and therefore the sender and the recipient can easily imagine that the electronic mail address of a destination located on the right side of the "−" is subtracted from the electronic mail address of a destination located on the left side. The order specifying operation symbols "("and")" are symbols used for specifying the order of operations in a general arithmetic expression, and therefore the electronic mail user can easily imagine that the operation of the electronic mail addresses between the order specifying symbols is performed with priority.

In the operation shown in the second row in the destination section 115 in FIG. 8, the destinations of the ceramic art club (B) and the sign language club (C) are placed between the order specifying operation symbols "("and")" so that the addition of these destinations is performed with priority, followed by the subtraction of the personal name, "Taro Yamamoto".

In this way, the operation of destinations to be performed with priority is placed between "("and")" so that the operation can be performed prior to the other operations of destinations.

A group option may be provided by using a sub-window for the recipient selection window in the normal state shown in FIG. 6 rather than by providing the dedicated recipient selection window in the use of the group option as shown in FIG. 8.

Figure 9:
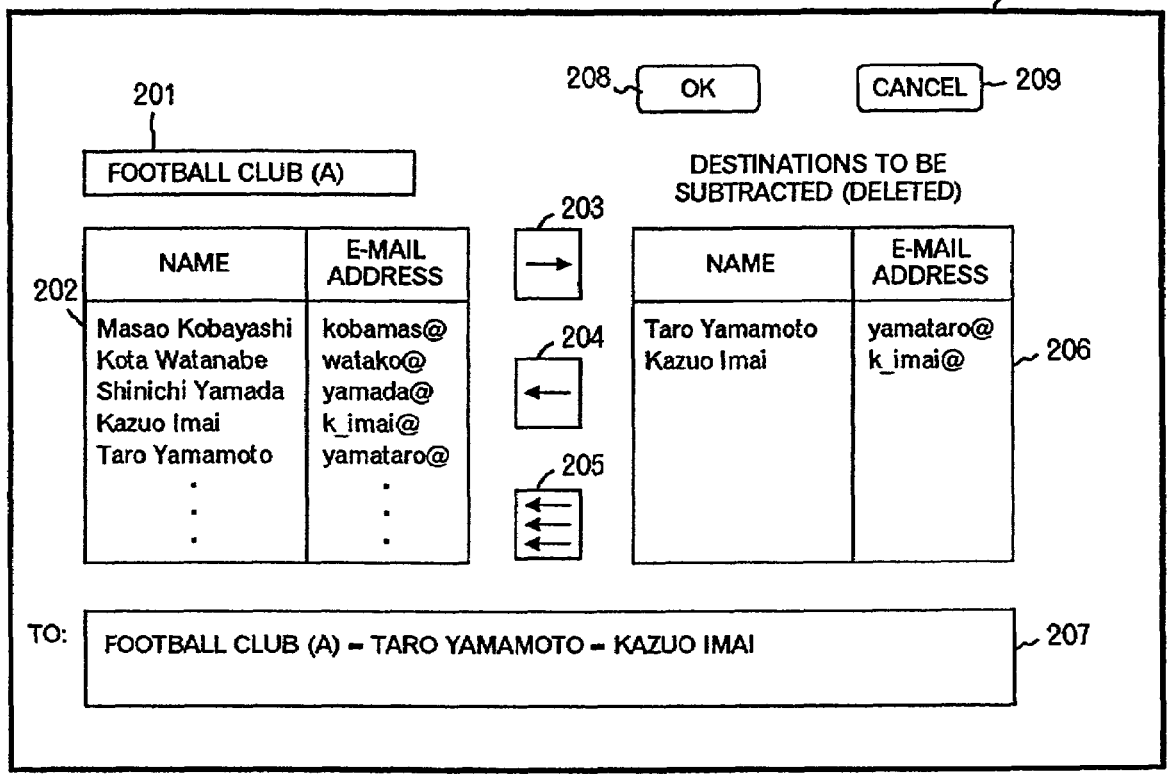
FIG. 9 is a view illustrating an example of a recipient selection window when a destination is subtracted from a group name.

FIG. 9 shows a destination subtraction window serving as a sub-window when a group is selected in the recipient selection window in the normal state in FIG. 6 and one or more members are subtracted (deleted) from the group name.

In a group name display section 201 in the destination subtraction window 200, a group name selected in the window in FIG. 6 is displayed, while in an address list section 202, personal names and electronic mail addresses of the members under the group name are displayed.

A selection button 203 is used to select a personal name of a member to be deleted from the address list section 202. A restore button 204 is used to restore a personal name of a member which has been selected. An all restore button 205 is used to restore altogether at a time the personal names of multiple members which have been selected. The personal names of the members selected by the selection button 203 are displayed in a subtraction destination section 206.

Items to be displayed in the destination section 115 in the recipient selection window 110 in FIG. 6 are displayed in a destination section 207 where a group name, subtraction symbols and personal names of selected members are displayed.

An OK button 208 is used if the result of subtracting one or more destinations from a group name is good (OK) and the result is reflected in the recipient selection window 110 shown in FIG. 6. A cancel button 209 is used to ignore the result of the subtraction if the result is not good (NG) and the recipient selection window 110 shown in FIG. 6 is to be regained.

Thus, when a destination is subtracted from a group name, the window in FIG. 6 and the window in FIG. 9 may be combined so that a group option similar to the window in FIG. 8 can be set.

Figure 10:
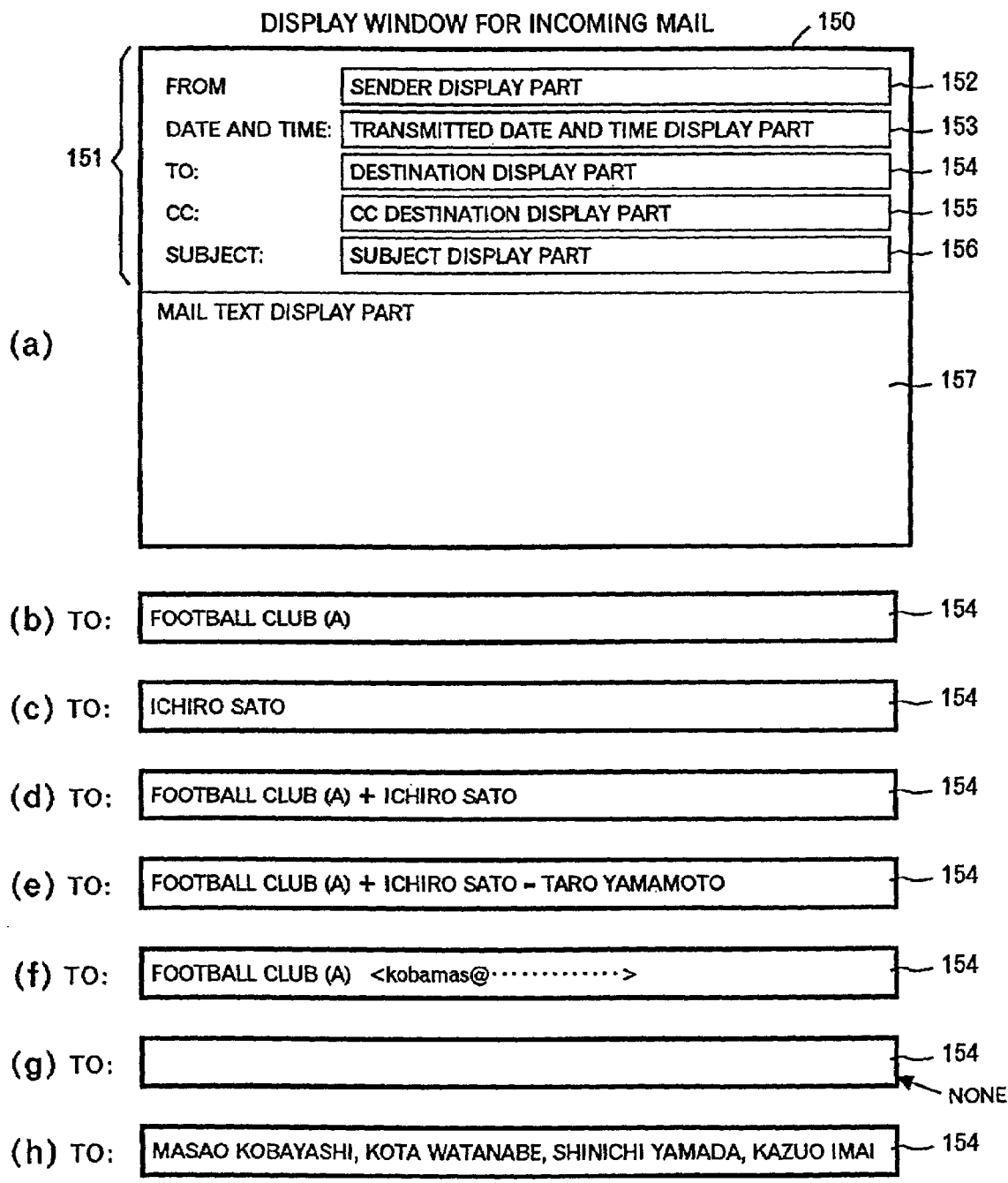
FIGS. 10(a) to 10(h) are examples of windows displaying a received electronic mail message.

FIG. 10 illustrates an example of a window displaying a received electronic mail message.

As shown in the general arrangement in FIG. 10(a), an incoming mail display window 150 includes a header part 151 indicating information used for transmission and reception of electronic mail, and a mail text display part 157 displaying a text communicated in an electronic mail message. The header part 151 includes a sender display part 152 displaying a personal name or address of a sender, a transmitted date and time display part 153 displaying the date and time of transmission, a destination display part 154 displaying recipient's personal and/or group name(s), a CC destination display part 155 displaying recipient's name(s) to receive a copy of the electronic mail message, and a subject display part 156 displaying a title or subject of the electronic mail message.

FIG. 10(b) shows an example of display in the destination display part 154 when the group option is not used and only the football club (A) is selected in the recipient selection window 110 in FIG. 6. In this case, only the group name is displayed in the destination display portion 154. If the group option is used and only the group name is notified without showing any personal name, this window is also displayed.

FIG. 10(c) shows an example of display in the destination display part 154 when only a personal name, Ichiro Sato is selected in the recipient selection window 110 in FIG. 6. In this case, only the personal name, Ichiro Sato is displayed in the destination display part 154.

FIG. 10(d) shows an example of a display in the destination display part 154 when the group option is used and the football club (A) and Ichiro Sato are added with the addition symbol "+" in the recipient selection window 120 in FIG. 8. In this case, the group name, the personal name, Ichiro Sato, and the addition symbol are displayed in the destination display part 154. Here, if the personal display deletion button 141 has been selected, for example, in the recipient selection window 120 in FIG. 8, items displayed in the destination section 144 in FIG. 8 and the destination display section 154 in FIG. 10(a) are the same as that shown in FIG. 10(b).

FIG. 10(e) shows an example of display in the destination display part 154 when the group option is used, the football club (A) and the personal name, Ichiro Sato, are added with the addition symbol "+", and a personal name, Taro Yamamoto, is subtracted with the subtraction symbol "−" in the recipient selection window 120 in FIG. 8. In this case, the group name, Ichiro Sato with the addition symbol, and Taro Yamamoto with the subtraction symbol are displayed in the destination display part 154. Here, if the personal display deletion button 141 has been selected, for example, in the recipient selection window 120 in FIG. 8, items displayed in the destination section 144 in FIG. 8 and the destination display section 154 in FIG. 10(a) are the same as that shown in FIG. 10(b).

FIG. 10(f) shows an example of display in a mailing list manner. In this case, the individual mail addresses of the group members are sequentially displayed following the displayed group name.

FIG. 10(g) shows an example of display provided when no destination is displayed. In this case, there is no display in the destination section of an incoming electronic mail message or a message such as "no destination displayed" is displayed.

FIG. 10(h) shows a list of the personal names of group members, which is similar to the conventional case when an electronic mail message is sent to multiple destinations.

Thus, according to the embodiment, for an item to be displayed in the destination section on the displayed window for incoming mail at a recipient, it can be selected as desired whether to display only a group name or both the group and personal names connected with an operation symbol.

While the examples of FIGS. 10(f) to 10(h) cannot be selected in the recipient selection window 120 in FIG. 8, they can be displayed by, for example, additionally providing a selection key in the recipient selection window 120.

The CC section is desirably displayed in the manner as shown in FIG. 10(h). This is because when a recipient of an electronic mail message composes a reply mail message, the items at the CC section may be used as they are, and therefore the conventional display is desirable.

According to the display examples shown in FIGS. 10(d) and 10(e), the operators or operation symbols according to the present invention could not be perceived if the electronic mail software used by the recipient is not the same as that used by the sender. However, if they can be perceived, the recipient can immediately acknowledge the destinations.

According to the display example in FIG. 10(b) in which only the group name is displayed, if the group option has been used and the recipient transmits a reply mail message with the group name, there might be a recipient of the reply mail message who has not received the original electronic mail message but receives only the reply mail message or, conversely, has received the original message but does not receive the reply mail message. However, despite such possible confusion, any added recipient can be aware of affiliation to the group, and any subtracted member of the group cannot be recognized by other group members.

Figure 11:
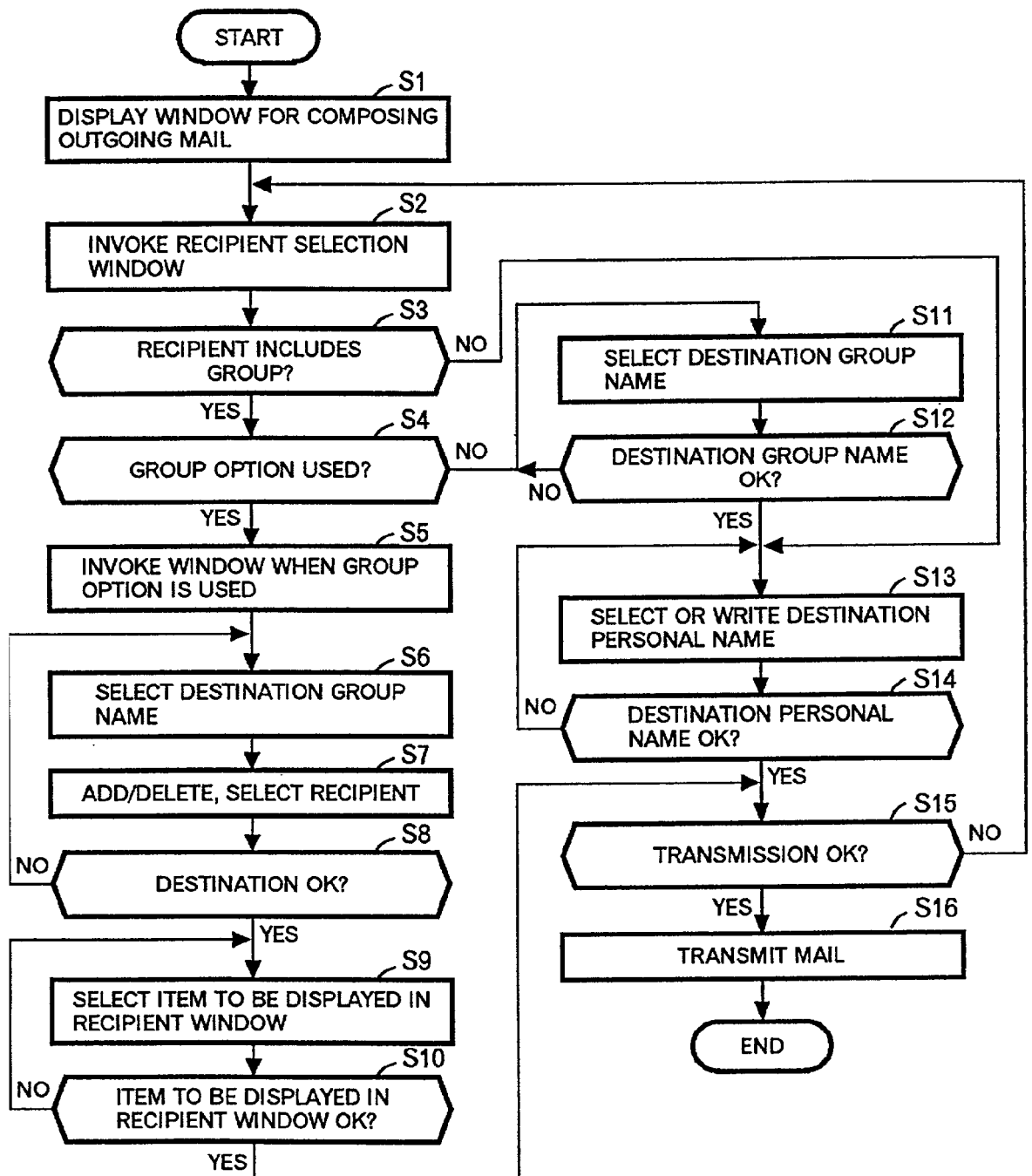
FIG. 11 is a flowchart illustrating a method of setting destinations of an electronic mail message according to the embodiment.

FIG. 11 is a flowchart illustrating a method of setting destinations of electronic mail according to the embodiment.

In the flowchart, it is assumed that the user of the communication terminal 1 in the intranet 10 in FIG. 1 composes an electronic mail message for transmission to the communication terminal 51 connected to the Internet 30. However, the flowchart may be applied similarly to the transmission and reception of an electronic mail message within the intranet 10 between, for example, the communication terminals 1 and 2, and also to the transmission of an electronic mail message to the communication terminal 1 in the intranet 10 from the communication terminal 51 connected to the Internet 30.

The flowchart of FIG. 11 will be now described in detail in conjunction with FIGS. 1 to 10.

The user of the communication terminal 1, for example, uses the outgoing mail composing software 82 to invoke the outgoing mail composing window 100 on the display device 61 of the communication terminal 1 (step S1). The user then directly inputs mail addresses of transmission destinations in the destination input part 102 using the input device 62, or invokes the recipient selection window having the address book displayed by clicking the address book reference button 107 (step S2) to input the mail addresses in the destination input part 102.

When one or more destinations are input in the destination input part 102 using the address book, the user of the communication terminal 1 determines whether the destinations include a group name (step S3). If a group name is included (YES in step S3), the user determines whether or not to use the group option (step S4). If no group name is included (NO in step S3), one or more personal names of destinations are selected or written in the destination input part 102 (step S13).

If the group option is used in the step S4 (YES in step S4), for example, the use group option button 113 is clicked in the recipient selection window 110 for outgoing mail in the normal state shown in FIG. 6, and the recipient selection window 120 for outgoing mail shown in FIG. 8 is invoked (step S5).

In the recipient selection window 120, using the selection button 111, the address book to be used is selected and displayed, and using the selection button 121, the mail addresses of all the members in a registered group are displayed. A row therein is clicked and highlighted for selection, and the destination button 114 is clicked to select a group name or a personal name for display in the destination section 115 (step S6).

When a personal name is added to a group name, the recipient addition button 131 for inserting the addition symbol in the destination section 115 is clicked, then the personal name to be added is specified similarly to step S6 and the destination button 114 is clicked. When a personal name is deleted from a group name, the recipient deletion button 132 for inserting the subtraction symbol in the destination section 115 is clicked, and the personal name to be deleted is specified similarly to step S6, and the destination button 114 is clicked. When the order of priorities in operation is specified, the specifying start button 133 for inserting the leading order specifying operation symbol before an operation expression with priority in the destination section 115 is clicked, and after the operation expression with priority, the specifying end button 134 for inserting the trailing order specifying operation symbol in the destination section 115 is clicked (step S7).

Thus, the mail address of any individual can be added to or deleted from the destination (recipient) of a group name. For example, the user can readily delete an electronic mail message addressed to the user him/herself when a common address file for an intranet is used to specify destinations.

The user of the communication terminal 1 then determines whether or not the destinations indicated in the destination section 115 are OK (step S8). If they are OK (YES in step S8), destination items to be displayed at the communication terminal 51 of the recipient of the electronic mail message are selected (step S9). When only a group name is to be displayed in the destination section of the recipient, the personal display deletion button 141 is clicked and then the destination button 143 is clicked, so that selected personal name and operation symbol are deleted from the items in the destination section 144, and only the group name is displayed. When not only the group name but also the personal name and the operation symbol are to be displayed in the destination section of the recipient, the all display button 142 is clicked and then the destination button 143 is clicked, so that the same items as those in the destination section 115 are displayed in the destination section 144.

In the above selection of the display items, if the personal display deletion button 141 has been used, a recipient indicated by a personal name can receive an electronic mail message addressed to group members, which eliminates possible disparity in information between the recipient and the group members, while a sense of alienation caused by her/his not being a member of the group can be overcome. If the all display button 142 has been used, it is readily recognizable that the same message is received not only by the group members but also a recipient indicated by a personal name, so that the recipient who clearly does not belong to the group does not have to worry about the information disparity.

The user of the communication terminal 1 then determines whether or not the destination items in the destination section 144 are OK (step S10). If they are OK (YES in the step S10), it is finally determined whether or not all the destinations are OK (step S15). If the destinations are OK (YES in step S15), the composed electronic mail message is transmitted (step S16), while if they are not OK (NO in step S15), the process returns to step S2 to invoke the recipient selection window.

If the group option is not used in step S4 (NO in step S4), an address book to be used is selected and displayed using the selection button 111 of the recipient selection window 110. A group name residing in a row in the address book is clicked and highlighted for selection, and then the destination button 114 is clicked to select the group name, which is selected and displayed in the destination section 115 (step S11).

The user of the communication terminal 1 then determines whether or not the group name in the destination section 115 is OK (step S12). If the group name in the destination is not OK (NO in step S12), the processing in step S11 is repeated, while if the destination group name is OK (YES in step S12), a personal name in the address book is clicked and highlighted for selection, and then the destination button 114 is clicked, so that the personal name for the destination is selected and displayed in the destination section 115 (step S13). It is then determined whether or not the personal name for the destination in the destination section 115 is OK (step S14). If the personal name for the destination is not OK (NO in step S14), the processing in step S13 is repeated, while if the personal name for the destination is OK (YES in step S14), the process proceeds to step 15 described above for final determination as to whether or not all the destinations are OK.

The operation of inputting a destination in the CC destination section 117 in FIG. 8 is similar to the process from steps S3 to S14 described above except that the destination button 114, the destination section 115, the destination button 143 and the destination section 144 are replaced by the CC destination button 116, the CC destination section 117, the CC destination button 145 and the CC destination section 146, respectively.

The operation of inputting a destination in the BCC destination section 117 in FIG. 8 is similar to the process from steps S3 to S14 except that the destination button 114 and the destination section 115 are replaced by the BCC destination button 118 and the BCC destination section 119, respectively, excluding steps S9 and S10.

The operation of transmitting an outgoing electronic mail message having destinations input as described above in a mail composing window will be now described.

Figure 12:
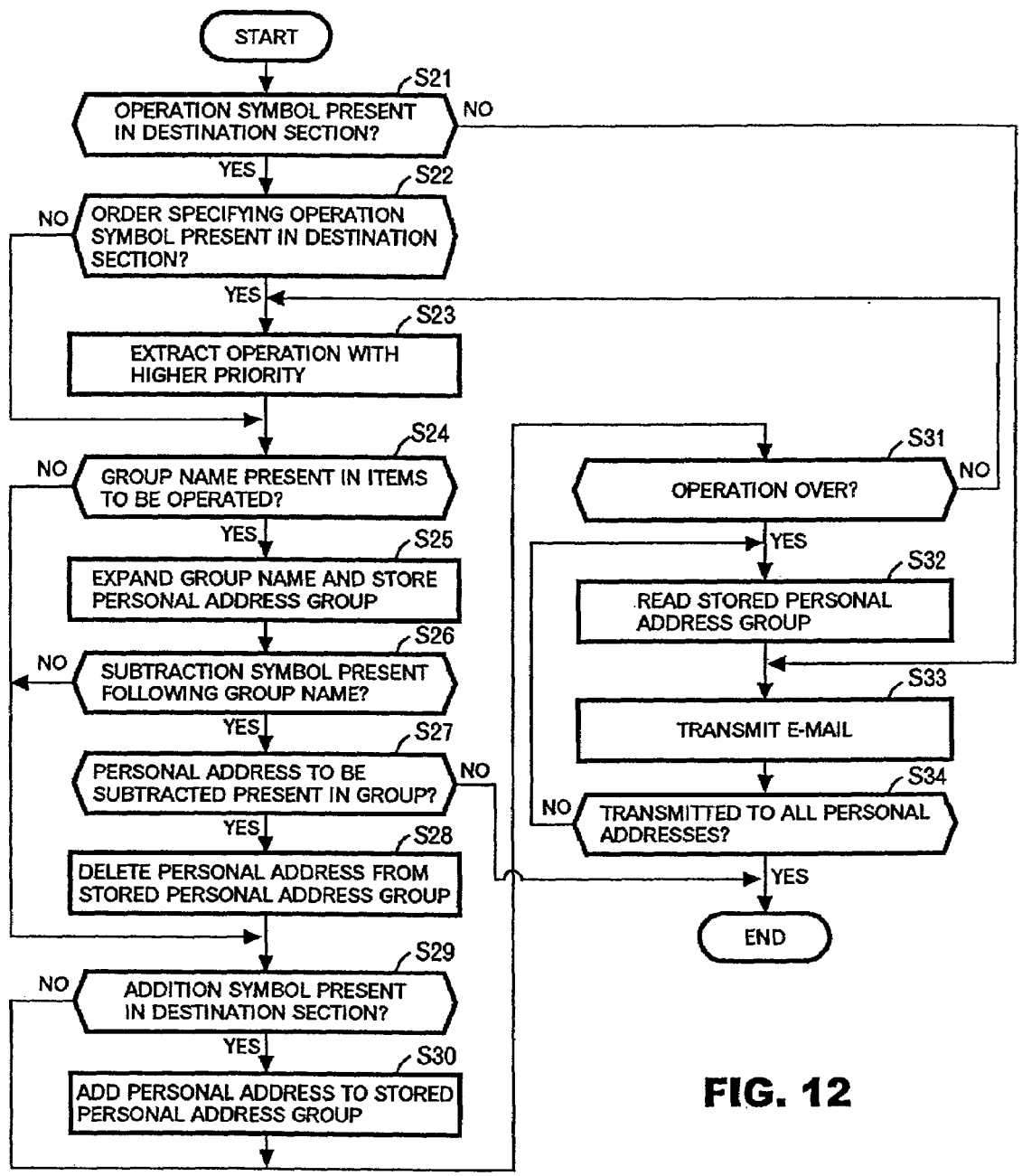
FIG. 12 is a flowchart illustrating how a mail message is transmitted from a communication terminal when destinations are set according to the embodiment.

FIG. 12 is a flowchart illustrating how a mail message is transmitted from a communication terminal after the destinations are set according to the embodiment.

When the destination input part 102 in the window for composing an outgoing electronic mail message as shown in FIG. 5 has been specified as described above, the outgoing mail management software 85 or the communication software 81, for example, at the communication terminal is used to determine whether or not operation symbols are present in the destination section (step S21). If there is no operation symbol (NO in step S21), the electronic mail is transmitted according to the items input in the destination section. If there is any operation symbol (YES in step S21), it is determined whether or not a pair of order specifying symbols such as "(" and ")" are included (step S22). If there are such order specifying symbols (YES in step S22), an operation with priority in the order is extracted from the destination section (step S23). If there is no order specifying symbol (NO in step S22), it is then determined whether or not there is a group name to be operated in the destination section (step S24).

If there is a group name included in the destination section (YES in step S24), the group name is expanded and stored as a group of personal addresses in a storage medium such as RAM (step S25). It is then determined whether or not there is a subtraction symbol following the group name (step S26). If there is the subtraction symbol (YES in step S26), it is determined whether the personal address to be subtracted is a member of the group from which the address is to be subtracted (step S27). If the personal address to be subtracted is a member of the group (YES in step S27), the personal address to be subtracted is deleted from the stored personal address group and then the resultant group is re-stored (step S28). If the personal address to be subtracted is not a member of the group (NO in step S27), which indicates an operation error, the operation processing is terminated.

If no group name is included in the destination section (NO in step S24), it is determined whether or not the addition symbol is included in the destination section (step S29). If there is the addition symbol included (YES in step S29), the personal address is added to the stored personal address group, or two personal addresses connected by the addition symbol are added together and stored (step S30).

If there is no addition symbol (NO in step S29), it is determined whether or not the operation input in the destination section is over (step S31). If the operation is not over (NO in step S31), the process returns to step S23 and the operation with the next priority is extracted from the destination section. If the operation is over (YES in step S31), the stored personal address group is read out (step S32), and an electronic mail message is sequentially transmitted to the destinations (step S33). Each time the electronic mail message is sent, it is determined whether or not the electronic mail message has been transmitted to all the personal addresses (step S34), and if it has not been transmitted to all the addresses (NO in step S34), the process returns to step S32 to read out from the stored personal address group. If transmitted (YES in step S34), the transmission processing is terminated.

In the embodiment described above, the items (destinations) input in the destination section using the operation symbols and the personal address group expanded from a group name are stored in a temporary storage medium such as a RAM and used only at the time of transmitting electronic mail, in other words, they are not exactly a destination list as registered in an address book or the like stored in nonvolatile storing means such as a hard disk drive. However, the items input in the destination section or the personal address group may be provided with a new group name for registration in the address book and later reused as a destination.

More specifically, the electronic mail software may be implemented such that destinations set using at least one of the addition and subtraction symbols and multiple group names or personal names selected from the destination list may be provided with a new group name and registered in the destination list. Similarly, destinations set using the order specifying operation symbols in addition to the addition and subtraction symbols, and multiple group names or personal names selected from the destination list may be provided with a new group name and registered in the destination list.

The electronic mail software may be implemented such that when the new group name registered as described above is used, using at least one of the addition symbol and the subtraction symbol, the new group name may be operated with another personal name or group name to set the destinations. Similarly, using the addition symbol, the subtraction symbol, and the order specifying operation symbols, the new group name may be operated with another personal name or group name to set the destinations.

The electronic mail software may be implemented such that when the new registered group name is used, the personal names and the operation symbols may be deleted from the recipient name data in the data to be transmitted before transmission of electronic mail, so that only the new group name is displayed in the destination section in the displayed window of the recipient.

As described above, according to the embodiment, the operation symbols to add and delete a mail address of a recipient registered as a member of a group can be predefined. As a result, the number of recipients can be increased or reduced as desired when a group name is used as a destination. Therefore, for example, even if an electronic mail message is sent under a group name and a sender's mail address is included in the group registered in the address book, the destination can readily be changed so that the electronic mail message is not sent to the sender.

Also, according to the embodiment, the destination items to be displayed on the recipient side can be selected between a group name only and the group name together with mail addresses, and therefore the sender can select whether to let the recipients aware or unaware of the addition to or deletion from the full members of the group.

Also, according to the embodiment, items (destinations) input in the destination section with each operation symbol or a personal address group expanded from a group name may be provided with a new group name, which is registered in an address book to reuse it as a destination. Therefore, if the user wants to send an electronic mail message to the previous destination (new group name), the new group name is read from the address book and the destination is set simply by placing the name in the destination section.

Since the destination indicated by the new group name registered may further be modified using the operation symbols, any change in the destination can be coped with in a flexible manner. Also, since the sender can select display of only the new group name in addition to the conventional all destination display for destination indication at the recipients, an added recipient can be aware of affiliation to the new group, while a deleted member of the new group cannot be recognized by other members of the new group.

Also, according to the embodiment, the recipient selection window for outgoing mail is used at the time of using the group option, so that regardless of the number of items registered under a group name in the address book, the sender can readily specify destinations having mail addresses partly different from the registered group name at the time of selecting destinations in the outgoing mail composing window.

While, in the embodiment, the operation symbols "+", "−", "(", and ")" are used for addition and subtraction of a destination, and specifying an order, other symbols obvious to indicate addition, subtraction or order specifying may also be used. For example, "&" or "AD" may be used as a symbol indicating addition, and "{" and "}" may be used for specifying an order.

The configuration of the communication terminal, the architecture of the electronic mail software and the arrangement of the displayed windows are described simply by way of illustrating the present invention, and other configuration, architecture or arrangement may be employed to implement the present invention.

ADVANTAGES OF THE INVENTION

As described above, according to the present invention, operation symbols used to add and delete a mail address as desired to and from destinations registered as a group are predefined in electronic mail software in a communication terminal. Therefore, when an electronic mail message having a group name as a destination is sent, any member can be deleted from the registered items under the group name, or a mail address of a person who is not a group member can readily be added.

Also, according to the present invention, when a destination is added to or deleted from the group name, items to be displayed as destinations of the electronic mail message at the recipients may be only the group name or may also include the name added or deleted, so that the sender can select whether or not to let the recipients be aware of the addition to or subtraction from the full members of the group.

Also, according to the present invention, the recipient selection window for outgoing mail is provided, which allows members within a group and operation symbols to be readily specified, when the group option is used. Therefore, regardless of the number of items registered under a group name in the address book, the sender can readily specify destinations having mail addresses partly different from the registered group name at the time of selecting destinations in the outgoing mail composing window.

Furthermore, according to the present invention, even if the mail address of the sender is registered under a group name in an address book residing, for example, in a mail server of an intranet, and an electronic mail message is sent under the group name, using the operation symbol, the mail address of the user can be deleted from the destinations specified under the group name, so that the electronic mail message is not transmitted to the sender.

Furthermore, according to the present invention, destinations or a personal address group formed by the operation symbols can be registered under a new group name and reused as a destination, so that the new group name can be read from the address book and placed in the destination section the next time the sender wants to send another electronic mail message to the same destination.

Also, according to the present invention, since the destination indicated by the new group name registered may further be modified using the operation symbols, any change in the destination can be coped with in a flexible manner. Furthermore, since the sender can select display of only the new group name for destination indication at the recipients, an added recipient can be aware of affiliation to the new group, while a deleted member of the new group cannot be recognized by other members of the new group.

The invention claimed is:

1. A recipient selection window being displayed on a display device of a sender communication terminal, said display device coupled to an input device via a processor, said input device configured to accept input from a user for determining recipients of an electronic mail (e-mail) message, said recipient selection window concurrently comprising:

an address list section displaying an electronic mail address book that includes at least one individual name of an individual and at least one group name of a mailing group;
a first destination section for specifying recipients of the e-mail message;

a first destination button for placing a selected name in the destination section in response to the destination button being clicked by the user, said selected name identifying a recipient of the e-mail message and being an individual name that is highlighted in the address list section or a group name that is highlighted in the address list section;

an addition recipient button for placing an addition operation symbol (+) in the destination section in response to the addition recipient button being clicked by the user, said addition operation symbol configured to cause an individual name or a group name appearing immediately to the right of the addition operation symbol to be added to individual or group names appearing to the left of the addition operation symbol; and a subtraction recipient button for placing a subtraction operation symbol (−) in the destination section in response to the subtraction recipient button being clicked by the user, said subtraction operation symbol configured to cause an individual name or a game name appearing immediately to the right of the subtraction operation symbol to be removed from individual or group names appearing to the left of the subtraction operation symbol.

2. The recipient selection window of claim 1, further comprising:

a start button for placing a start operation symbol of a left parentheses in the destination section in response to the start button being clicked by the user;

an end button for placing an end operation symbol of a right parentheses in the destination section in response to the end button being clicked by the user such that the end operation symbol appears to the right of the start operation symbol;

wherein individual names, group names, addition operation symbols, or subtraction operation symbols appearing between the start operation symbol and the end operation symbol are adapted to be processed together with priority relative to any individual names, group names, addition operation symbols, or subtraction operation symbols that appear in the destination section between the start operation symbol and the end operation symbol.

3. The recipient selection window of claim 1, further comprising:

a personal display button for specifying that only the group names and not the individual names appearing in the first destination section are to be displayed at a recipient communication terminal of each recipient of the e-mail message, in response to the personal display button being clicked by the user; and an all display button for specifying that the group names and individual names appearing in the first destination section are to be displayed at the recipient communication terminal of each recipient of the e-mail message, in response to the all display button being clicked by the user.

4. The recipient selection window of claim 3, further comprising:

a second destination button; and a second destination section for listing particular recipients of the e-mail message in response to the second destination button being clicked by the user, said particular recipients of the e-mail message listed in the second destination section to be displayed at the recipient communication terminal of each recipient in accordance with whether the personal display button or the all display button has been clicked by the user.

5. The recipient selection window of claim 4, wherein the second destination section is a second TO destination section for TO recipients of the e-mail message, and wherein the second destination button is a second TO destination button.

6. The recipient selection window of claim 4, wherein the second destination section is a second carbon copy (CC) destination section for CC recipients of the e-mail message, and wherein the second destination button is a second CC destination button.

7. The recipient selection window of claim 4, wherein the first destination section is a first TO destination section for TO recipients of the e-mail message, and wherein the first destination button is a first TO destination button.

8. The recipient selection window of claim 1, wherein the first destination section is a first carbon copy (CC) destination section for CC recipients of the e-mail message, and wherein the first destination button is a first CC destination button.

9. The recipient selection window of claim 1, wherein the first destination section is a first blind carbon copy (BCC) destination section for BCC recipients of the e-mail message, and wherein the first destination button is a first BCC destination button.

10. A communication apparatus comprising a first communication terminal that is displaying the recipient selection window of claim 1, wherein the first communication terminal consists of the sender communication terminal.

11. A method for setting destinations of electronic mail through use of the recipient selection window of claim 1, said method comprising:

displaying the recipient selection window; and sending the e-mail message to the recipients appearing in the first destination section in response to at least one button having been clicked by the user, said at least one button comprising the first destination button and at least one recipient button selected from the group consisting of the addition recipient button, the subtraction recipient button, and a combination thereof.

12. Electronic mail software stored in a computer-readable memory device, said electronic mail software utilizing the recipient selection window of claim 1, said mail software comprising:

software for displaying the recipient selection window; and software for sending the e-mail message to the recipients appearing in the first destination section in response to at least one button having been clicked by the user, said at least one button comprising the first destination button and at least one recipient button selected from the group consisting of the addition recipient button, the subtraction recipient button, and a combination thereof.

* * * * *